Patented Oct. 18, 1927.

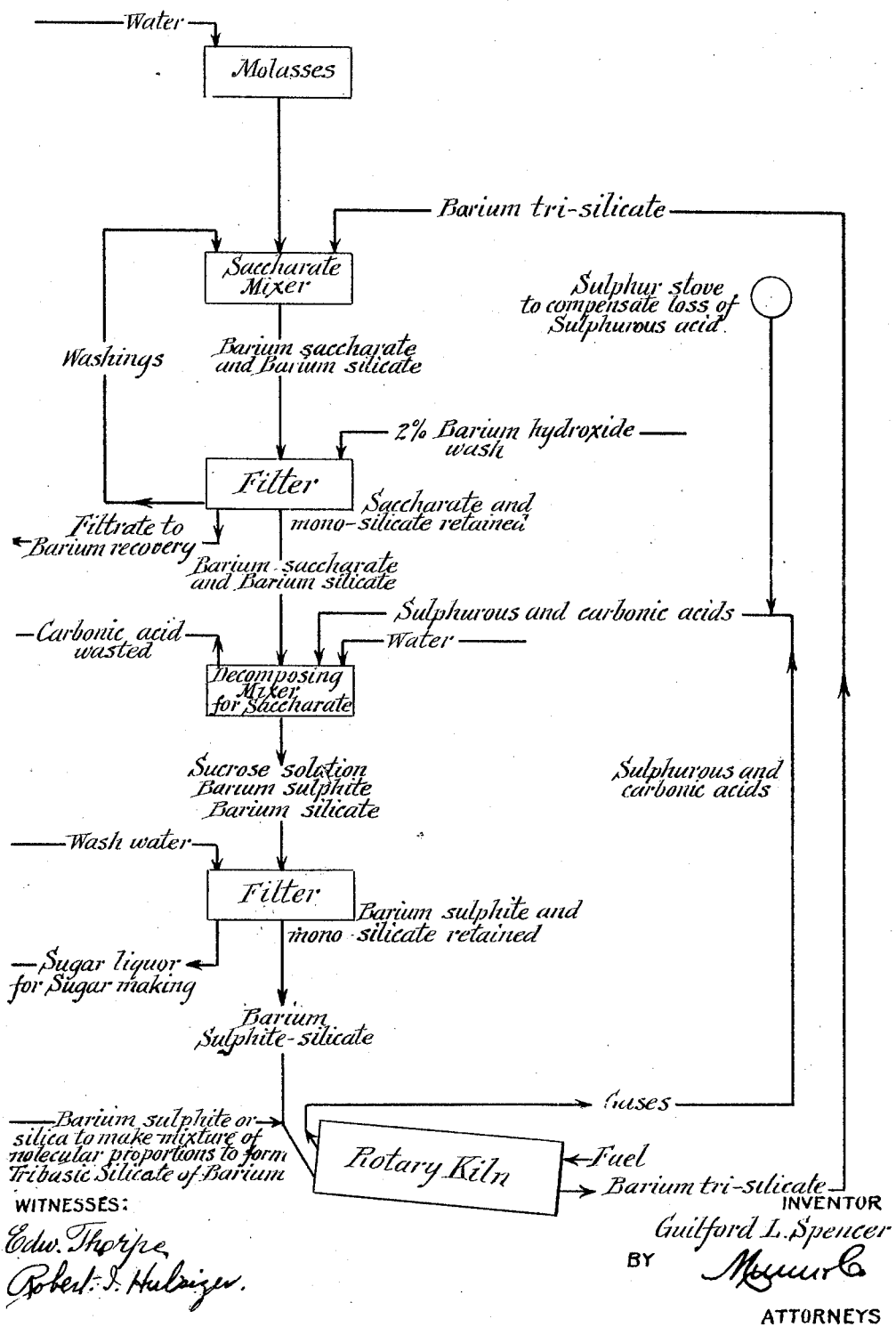

1,646,323

UNITED STATES PATENT OFFICE.

GUILFORD L. SPENCER, OF HERRICKS, MAINE, ASSIGNOR TO THE CUBAN-AMERICAN SUGAR CO., OF NEW YORK, N. Y., A CORPORATION OF NEW JERSEY.

PROCESS OF DESUGARING MOLASSES.

Application filed October 31, 1923. Serial No. 671,947.

This invention relates to a process of desugaring molasses obtained from sugar beets and sugar cane.

An object of the invention is to provide a simple and efficient process in which the ingredients or agents used for the separation of the sucrose from the molasses are used continuously over and over again in the cycle of operation and require replenishing only to a very small degree, thus making the process a substantially continuous one.

Another object concerns the provision of a process in which the ingredients used are so selected that previous undesirable compounds and reactions are avoided, so that the maximum yield of sucrose is obtained.

A further object concerns the provision of means whereby the various steps and reactions can take place in their proper order with the minimum amount of labor and time required on the part of those concerned in the carrying on of the process.

The residual molasses or mother liquor which is left after the crystallization of the commercial sugar contains, in addition to sucrose, most of the organic and inorganic impurities of the juice. Generally the word "impurities" is used, and especially in this application, to indicate all constituents of the cane or beet juice or molasses other than sucrose. For instance, in addition to sucrose, the molasses from the cane usually contains variable quantities of dextrose and levulose, usually and hereinafter referred to as glucose, and possibly traces of other carbohydrates. Beet molasses usually contains no glucose but some raffinose, which is not largely precipitated by barium under the conditions of my process.

It has long been customary to desugar beet molasses by precipitation of the sucrose with calcium or strontium, but these processes have not been readily applicable to cane molasses on account of either the precipitation or the destruction of the glucose. In the one case the glucose is carried in the precipitates with the sucrose and prevents its recovery, whereas, in the other case the glucose decomposition products complicate and hinder the process. The precipitation of sucrose from molasses as the monobasic barium saccharate is, however, in accordance with my investigation, not attended by the difficulties mentioned. The saccharate, however obtained, is impure and must be washed, after which it must be decomposed to free the sucrose in water solution and convert the precipitate into an insoluble salt. In the previously used calcium saccharate process, the saccharate from beet molasses is readily decomposed with carbonic acid gas but saccharate from cane does not yield readily to this treatment.

I have found, however, that barium in some form or other is the best precipitant of the sucrose of cane molasses and is highly adapted to the treatment of beet molasses. I have also found that the use of sulphurous acid. free or combined as water insoluble sulphite which is soluble in sulphurous acid, to be a suitable reagent under the conditions which I specify, for the decomposition of barium saccharate into a water solution of sucrose and an insoluble salt of barium or, if a sulphite is used, into an insoluble salt of barium and the hydroxide of the base of the sulphite, which is also insoluble in water.

The process according to my invention, therefore, involves the precipitation of the sucrose from cane or beet molasses as barium saccharate by the addition to the diluted molasses of a tribasic silicate of barium. This is followed by the decomposition of the saccharate with sulphurous acid or with a sulphite, which results in the recovery of the sucrose in water solution and the recovery of the barium and other chemicals for reuse with substantially immaterial losses. The sucrose solution is suitable for concentration and crystallization of the commercial sugar by the customary method. The cycle of the chemicals is a complete one, these being returned to the process almost without loss.

More specifically, my invention consists in adding tribasic barium silicate to molasses which has been diluted with water, adding the silicate in sufficient quantity for a part of its barium to combine with the sucrose as a saccharate, whereas another part forms more or less complex combinations with the impurities and decomposition products of the glucose, also another part is carried on through the process in the form of the monobasic barium silicate and the remainder continues in solution, imparting strong alkalinity to the mixture. The reaction takes place at ordinary temperatures, but more rapidly and with larger and desirable decomposition of glucose at temperatures above 60° C. and preferably at a temperature near the boiling point of the mixture. The composition of the molasses, especially as regards sucrose, glucose, and water content, largely determines the amount of water and barium salt needed, but a considerable and indeterminate quantity of the barium salt is also required to provide the alkalinity necessary. A typical sugar cane molasses of the analysis stated farther on, would require the indicated quantities of reagents, and beet molasses carrying no glucose would require less barium, so also would a refinery molasses. Laboratory tests are necessary to an estimate of the requirement of chemicals. Impurities and sugars hinder the reactions, as is usual in all chemical combinations made in the presence of these, and consequently more than the theoretical quantity of reagents is necessary. The recovered tribasic silicate is impure and this condition must be considered. The requirements for any cane molasses would vary little from those of this material whose analysis follows:—

|  | Per cent. |
|---|---|
| Water, by drying | 20 |
| Sucrose, by Clerget method | 38 |
| Glucose | 15 |
| Ash | 11 |
| Undetermined, by difference | 16 |
| Total | 100 |

One hundred parts of molasses of this or approximately this composition, would require the equivalent of about 90 parts of crystallized barium hydroxide as tribasic barium silicate of about 85% purity, to decompose the glucose, precipitate the sucrose, combine with the decomposition products of the glucose and organates and with the impurities. The barium tribasic silicate yields two-thirds of its barium as the hydroxide on treatment with water, hence the requirement of this salt of the purity stated would be about 87 parts. The water requirement is met partly by the water of the molasses itself. To complete this and provide sufficient fluidity of the mixture, 50 parts of water or a little more, is required, which is supplied largely by the saccharate washings. Part of the water is added to the molasses to reduce its viscosity. The barium trisilicate is added to the remainder of the water in a mixer and this is heated to near boiling and the molasses is then added gradually, with stirring. The glucose is decomposed and the saccharate of barium soon precipitates, also some of the impurities and decomposition products precipitate as barium salts and one-third of the total barium is converted into the monosilicate and is precipitated. These precipitates are collected on a filter and washed with water containing two per cent of barium hydroxide in solution, with separation of the mother liquor or lye from the washings. The washings are returned to the saccharate mixer as has been indicated, to reduce sucrose losses and economize water, and the mother liquor is separately treated with sulphurous acid for the recovery of the barium as sulphite. The washed precipitates are treated with sulphurous acid, or as hereinafter explained, with a sulphite, to a little short of saturation of the barium of the saccharate and of the easily decomposable barium salts, the monosilicate remaining intact. The sucrose is liberated in water solution. The mixture is filtered and the filtrate, a substantially pure solution of sucrose, is used in sugar making, by customary methods, but after chemical removal of any traces of barium. If a sulphite be used instead of sulphurous acid, it must be soluble in sulphurous acid and its base must form an insoluble hydroxide. For example, if zinc sulphite in sulphurous acid were used under the conditions of the decomposition as has been described, the same precipitations would occur and zinc hydroxide would be also precipitated. This requires the suspension of the precipitates in water, after the removal of the sucrose, sulphitation to conversion of the zinc hydroxide into the sulphite and then further sulphitation to solution of this sulphite and finally filtration to separate the precipitates. This treatment involves some solution of barium sulphite, but this does not conflict with proper reuse of the zinc salt. To the combined precipitates of barium sulphite and monosilicate is added the barium sulphite obtained by precipitation from the mother liquor or lye and this mixture of precipitates is brought to the molecular proportions of tribasic silicate by the addition of silica or barium sulphite, as chemical analysis may indicate to be necessary. The organic impurities of the molasses supply carbon if needed. These mixed sulphite and silicate precipitates are reduced to a slurry with water and this slurry is calcined in a rotary cement kiln, heated by fuel oil or coal, as is cement in that industry, except at a temperature approximating 2600° to 2760° F. The barium issues from the kiln in small lumps as an impure tribasic silicate, and reenters the process after reduction to a fine powder. The kiln gases consist largely of sulphurous acid and carbonic mono- or dioxide. The first may be recovered for use in the sulphitation or sulphur may be burned to supply sulphurous acid. The carbonic gases are wasted in the sulphitation.

It may be noted from this description that, theoretically, only sucrose and impurities are removed and that the barium, silica and sulphur, and also the base of the sulphite if one is used, are recovered and returned to the process. Actually, of course, there is a slight loss of all material and a small constant renewal is necessary.

In the drawing a diagram of the process is set forth and is so clearly lettered as to be understood from a careful consideration of the set-forth description. It will be noted that slight amounts of sulphur can be added to the cycle to compensate for the loss and that other losses are also taken care of. It is also obvious that this process is a simple, efficient and complete one in which the operation takes place in a continuous manner and in which either beet or cane molasses can be with practically equal efficiency treated for the removal therefrom of sucrose.

The terms "tribasic barium silicate", "barium trisilicate", "barium tribasic silicate" are all used synonymously to refer to the chemical compound in which barium combines with silica according to the formula $(3BaO)SiO_2$ or, expressed in another way, $Ba_3SiO_5$. "Monobasic barium silicate" and "barium monosilicate" refer to the silicate of barium given in the reference books as $(BaO)SiO_2$ or $BaSiO_3$. (See Van Nostrand's Chemical Annual—Properties of inorganic compounds.)

The "tribasic barium silicate" is made by heating barium sulphite and silica in a rotary kiln to a temperature of about 1500° C., the proportions of the two ingredients and the reaction that takes place being indicated by the following:

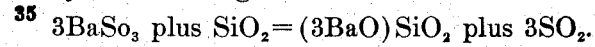

$$3BaSO_3 \text{ plus } SiO_2 = (3BaO)SiO_2 \text{ plus } 3SO_2.$$

What I claim is:—

1. A process of desugaring molasses, which includes the direct treatment of the molasses with tribasic barium silicate derived from barium sulphite and silica.

2. The process of desugaring molasses, which includes the treatment of molasses diluted with water with tribasic barium silicate derived from barium sulphite and silica, resulting in the formation of barium saccharate and monobasic barium silicate.

3. The process of desugaring molasses, which includes the treatment of the molasses with tribasic barium silicate to precipitate the sucrose and monobasic barium silicate, the filtration of the mixture and then the treatment of the precipitates with sulphurous acid to achieve the release of the sucrose and the formation of insoluble barium sulphite.

4. The process of desugaring molasses, which includes, first, the precipitation of the sucrose as barium saccharate, and of monobasic barium silicate, by the addition of barium tribasic silicate, the filtration of the mixture, then the treatment of the precipitates with sulphurous acid to achieve the release of the sucrose and the formation of insoluble barium sulphite.

5. The process of desugaring molasses, which includes the treatment of the molasses, first, with tribasic barium silicate to precipitate the sucrose as barium saccharate and part of the barium as monobasic barium silicate, then the treatment of these precipitates with sulphurous acid to free the sucrose and to form barium sulphite which when calcined with the monobasic silicate reunite to form the original combination of tribasic barium silicate which can be returned to the cycle.

6. The process of desugaring molasses, which includes the treatment of the molasses with tribasic barium silicate to precipitate the sucrose as barium saccharate and part of the barium as monobasic barium silicate and then the treatment of these precipitates with sulphurous acid to free the sucrose and to form barium sulphite which when calcined with the monobasic barium silicate in molecular proportions will reunite to form the original tribasic barium silicate which can be returned to the cycle, the sulphurous acid being also obtained for return to the cycle during the calcination.

7. The process of desugaring molasses, which includes adding thereto a slight amount of water, treating the molasses with tribasic barium silicate, to precipitate the sucrose as barium saccharate and part of the barium as its monobasic silicate; filtering the mixture while washing the precipitates with a barium hydroxide solution; adding sulphurous acid to the precipitates, to free the sucrose and form an insoluble barium sulphite; filtering the mixture to separate the sucrose; passing the barium sulphite and the barium monosilicate through a calcining medium wherein the original form of the barium tribasic silicate is obtained, as well as the original sulphurous acid, both of these being returnable to the process with slight loss.

8. The process of desugaring molasses, which includes, first, the treatment of the molasses with tribasic barium silicate, which in the presence of water decomposes into the hydroxide of barium and the monosilicate of barium, the former uniting with the sucrose to precipitate barium saccharate and the latter remaining as a practically insoluble precipitate, then the removal of these precipitates from the mother liquor by filtration, and finally the treatment of the above described precipitates with sulphurous acid in quantity sufficient to very nearly saturate the barium of the saccharate, to achieve the release of the sucrose in water solution and the precipitation of the barium of the saccharate as the sulphite.

9. The process of desugaring molasses, which includes, first, the formation of barium saccharate and monobasic barium silicate by the addition of tribasic barium silicate, the filtration of the mixture, then the nearly complete saturation of the barium saccharate with sulphurous acid to achieve the release of the sucrose in water solution and the formation of barium sulphite, then filtration of this mixture, and the calcination of the barium sulphite and barium silicate in the molecular proportions required by barium tribasic silicate, in a rotary cement kiln, heated with oil or other fuel to approximately 2600° to 2760° F., to convert these into tribasic barium silicate, which is returned to the process.

GUILFORD L. SPENCER.